Jan. 24, 1967        A. C. IBISCH        3,299,546
ROTARY SNOW PLOW

Filed April 13, 1964        10 Sheets-Sheet 2

INVENTOR.
ALVIN C. IBISCH
BY Joseph G. Werner
ATTORNEY

Jan. 24, 1967   A. C. IBISCH   3,299,546
ROTARY SNOW PLOW

Filed April 13, 1964   10 Sheets-Sheet 3

INVENTOR.
ALVIN C. IBISCH
BY
ATTORNEY

Jan. 24, 1967    A. C. IBISCH    3,299,546
ROTARY SNOW PLOW
Filed April 13, 1964    10 Sheets-Sheet 10

INVENTOR.
ALVIN C. IBISCH
BY  *Joseph G. Werner*
ATTORNEY

United States Patent Office 3,299,546
Patented Jan. 24, 1967

1

3,299,546
ROTARY SNOW PLOW
Alvin C. Ibisch, 347 Middleton St.,
Columbus, Wis. 53925
Filed Apr. 13, 1964, Ser. No. 359,254
9 Claims. (Cl. 37—43)

My invention relates to improvements in rotary snow plows.

One object of my invention is to provide a rotary snow plow having a novel rotor which allows the plow to handle more snow with less power loss than previously known rotary plows.

Another object of my invention is to provide a rotary snow plow having an improved structure for rotatably connecting the rotor housing to the vehicle which supports the housing and drives the rotor.

Another object of my invention is to provide a rotary snow plow having an improved apparatus for rotatably connecting a nozzle to the spout through which snow is discharged.

Another object of my invention is to provide a rotary snow plow having a pivotable chopper blade which can pull high drifts of snow into the rotor.

Yet another object of my invention is to provide a rotary snow plow having a wing blade to direct snow which lies to the side of the plow into the rotor.

A further object of my invention is to provide a rotary snow plow having a novel device that allows the wheels of the plow to climb curbs or other obstructions.

Other objects and advantages of my invention will be apparent from the following detailed description taken in conjunction with the accompanying drawings, in which a preferred embodiment of the principles of the invention has been selected for exemplification.

In the drawings:

FIG. 15 is a top view of the snow plow of FIG. 14 attached to a different vehicle than shown in FIG. 14.

Referring more particularly to the drawings in which like reference numbers refer to like parts, it is seen that, in general, a basic element of my rotary snow plow is the rotor 10. The rotor 10 is mounted on a substantially horizontal shaft 20, and bites into snow much as a drill bites into wood.

As shown in the drawings, the rotor 10 is enclosed by a substantially cylindrical rotor housing 11. The housing 11 has a front opening 12 through which snow enters to reach the rotor 10. To help funnel the snow into the opening 12, scoops 13, 14, 15 and 16 project forwardly from around its perimeter.

A spout 17 extends tangentially upward from the rotor housing 11. A nozzle 18 is rotatably secured to the top of the spout 17. Snow is discharged from the rotor 10 through the spout 17 and the nozzle 18. By rotating the nozzle 18, the snow may be directed to the area in which it is to be piled.

Any conventional vehicle 19 may be used to carry the rotor housing 11 and drive the rotor 10. A novel coupling device may be used to swivelably secure the rotor housing 11 to the vehicle 19, as will be described in more detail as the description progresses.

The rotor 10, shown in detail in FIGS. 1 to 5, may now be described in detail. Its basic elements include a shaft 20, a substantially flat and circular back plate 21, paddles 22, blades 23, circumferential panels 24 and preferably, a hub 25. The hub 25 has a flange 26 at its rear end 27. The rear face 30 of the back plate 21 is secured to the flange 26 by bolts 28 or other suitable means. To rigidly fit the shaft 20 within the hub 25, both elements are preferably tapered and keyed. A nut 31 or other suitable means keeps the hub 25 from sliding off the shaft 20.

The paddles 22 extend forwardly from the front face 29 of the back plate 21. They are substantially perpendicular to the plate front face 29, and are secured to it at their rear edges 44a by brackets 32, welding (not shown) or other similar means. The illustrated rotor 10 has four paddles 22. Any suitable number of paddles 22 may, however, be used.

Figure 3:
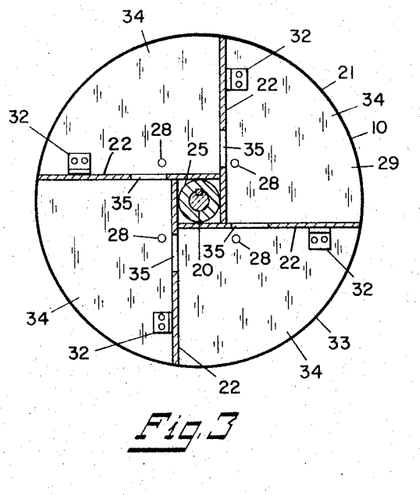
FIG. 3 is a section view taken along line 3—3 in FIG. 2.

The paddles 22 are substantially symmetrically positioned about the hub 25 on the front face 29 of the back plate 21, thereby dividing the front face 29 into substantially identical sectors of a circle. Each of the four paddles 22 is approximately tangential to the hub 25, as shown in FIG. 3, and extends from the perimeter 33 of the back plate 21 to the point at which it meets the adjacent paddle 22. Each paddle 22 is thus substantially perpendicular to the two paddles adjacent to it. A deep pocket 34 having the approximate outline of a circle sector is defined by each pair of adjacent paddles 22 and the back plate 21. The illustrated rotor 10 has four such pockets 34.

Figures 1, 2, 4:
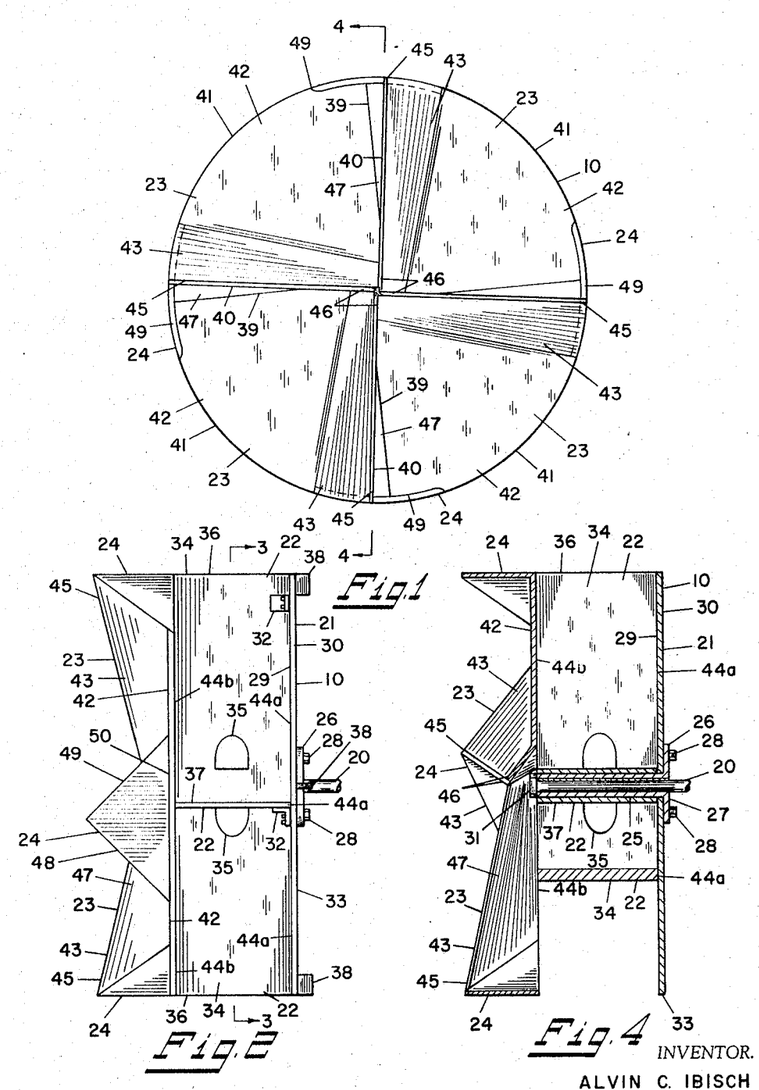
FIG. 1 is a front view of my new rotor.
FIG. 2 is a side view of the rotor of FIG. 1.
FIG. 4 is a section view taken along line 4—4 in FIG. 1.

Preferably, each paddle 22 has an opening 35 to relieve any possible air pressure between a pocket 34 and incoming snow, as shown in FIGS. 2 and 4. The paddles 22 may be approximately rectangular. It is preferred, however, that the paddles 22 be slightly wedge-shaped, with their outer edges 36 being longer than their inner edges 37. If the paddles 22 are slightly wedge-shaped, the depth of each pocket 34 increases steadily in size from the inside to the outside of the pocket 34. Discharge of snow from the pockets 34 to the spout 17 is thereby aided.

Figure 5:
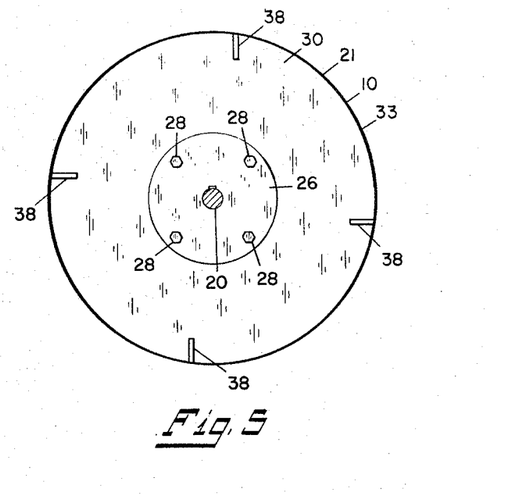
FIG. 5 is a rear view of the rotor of FIG. 1.

A plurality of fins 38 are secured at spaced intervals around the rear face 30 of the back plate 21, as shown in FIG. 5. The fins 38 help expel from the rotor housing 11 any snow that may seep behind the back plate 21.

Each paddle 22 has a corresponding blade 23. The blades 23 have the approximate outline of a circle sector and are of sufficient size to span the distance between two adjacent paddles 22. Each has a trailing radial edge 39 and a leading radial edge 40, and a circumferential edge 41. The blades 23 each have two distinct portions 42 and 43. The first substantially flat portion 42 is adjacent the trailing radial edge 39 and is approximately parallel to the back plate 21. The second portion 43 is adjacent to and includes all of the leading radial edge 40, and slopes forwardly from the first portion 42.

Each blade 23 is secured for a substantial length of its radial edge 39 to the forward edge 44b of a paddle 22. The blade 23 is of such size, and the second portion 43 is of such slope that its radial edge 40 is then spaced approximately directly forward of the radial edge 39 of the adjacent paddle 22. The second portion 43 is so sloped that the outer corner 45 of the radial edge 40 is spaced further forward from the paddle 22 than is the inner corner 46. The inner corners 46 of all the blades 23 are secured together by any suitable means, welding being one preferred method.

By this construction, an opening 47 to each pocket 34 is defined between the sloping second portion 43 of one blade 23 and the first portion 42 of the adjacent blade 23. The openings 47 provide for a front entrance to the pockets 34.

An arcuate circumferential panel 24 is secured between adjacent blades 23 at each of the openings 27. As best shown in FIG. 2, the panels 24 are substantially triangular in outline and have edges 48, 49 and 50. The edge 48 is attached to the circumferential edge 41 of a blade second portion 42, and the edge 50 to the circumferential edge 41 of a blade first portion 43. While each blade 23 and its corresponding circumferential panel 24 have been described as separate pieces, they may be constructed of a single piece of material. The radial edge 40 of each of the blades 23 and the edge 49 of each of the circumferential panels 24 are preferably sharpened to enable them more easily to bite into the snow.

The principal advantages of my improved rotor construction are that there are no obstructions to the path of the snow as it moves into and out of the rotor pockets 34, and that the amount of frictional contact between the moving snow and the rotor housing is minimized. The openings 47 to each pocket 34 contain no obstructing support members for the blades 23. The rotor back plate 21 substantially prevents sliding contact between the snow in the pockets 34 and the rotor housing 11 behind the rotor. As a result, my novel snow blower is able to minimize power losses due to friction, and to handle more snow with less power than conventional snow blowers.

FIGS. 6 to 10 illustrate an exemplary housing 11 for a rotary snow plow having one rotor 10. The housing 11 is approximately cylindrical, to enclose the generally cylindrical rotor 10. It has an approximately cylindrical surface 50 and a back 51. The front of the cylindrical surface 50 is not closed, but has the substantially circular opening 12 through which snow reaches the rotor 10.

Figures 6, 6A:
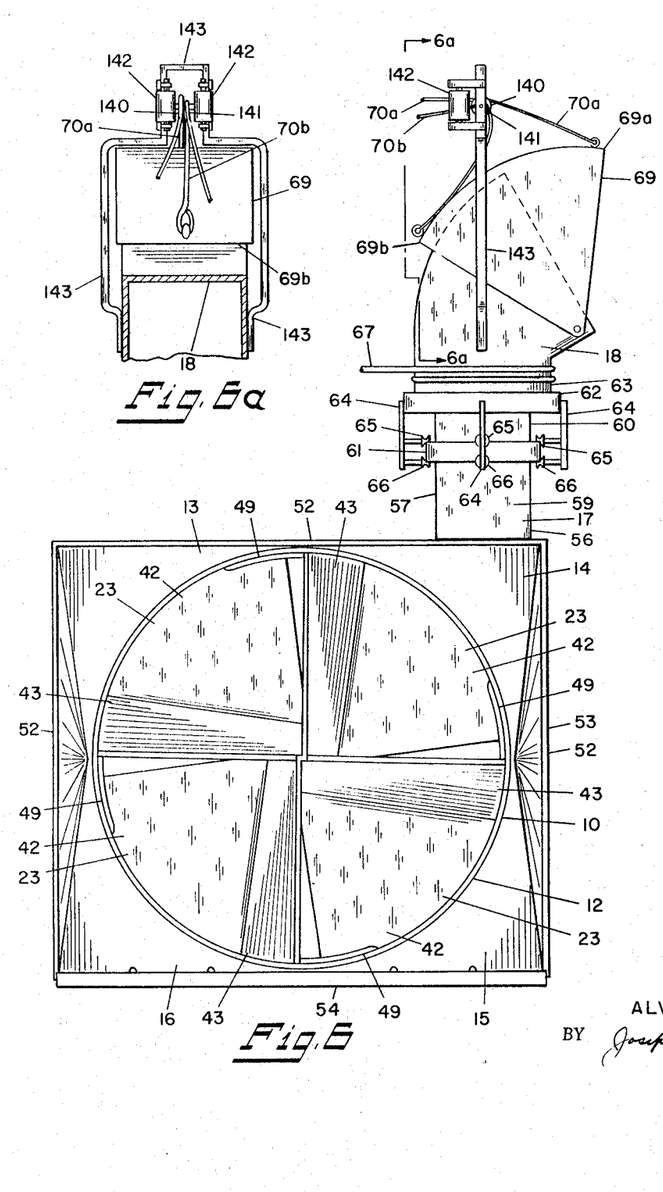
FIG. 6 is a front view of a rotor housing for a rotary snow plow employing the rotor of FIG. 1.
FIG. 6a is a partial section view taken along section line 6a—6a of FIG. 6.

The scoops 13, 14, 15 and 16 each have generally circular inner ends and project forwardly from one of the quadrants of the circular opening 12. Four substantially triangular plates 52 complete a funnel 53 with the scoops 13, 14, 15 and 16. The front edges of the plates 52 preferably extend to and slightly forward of the foremost corners 45 of the blades 23. A replaceable blade 54 is preferably secured to the bottom of the funnel 53 along the scoops 15 and 16 and the bottom plate 52.

Figure 7:
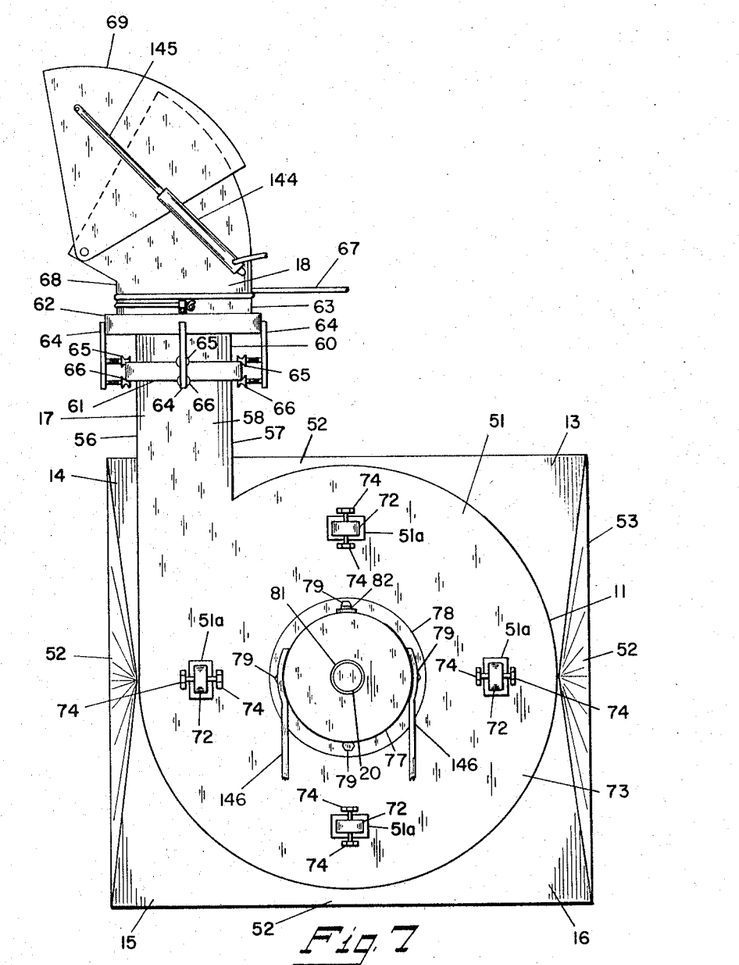
FIG. 7 is a rear view of the housing of FIG. 6.
Figure 8:
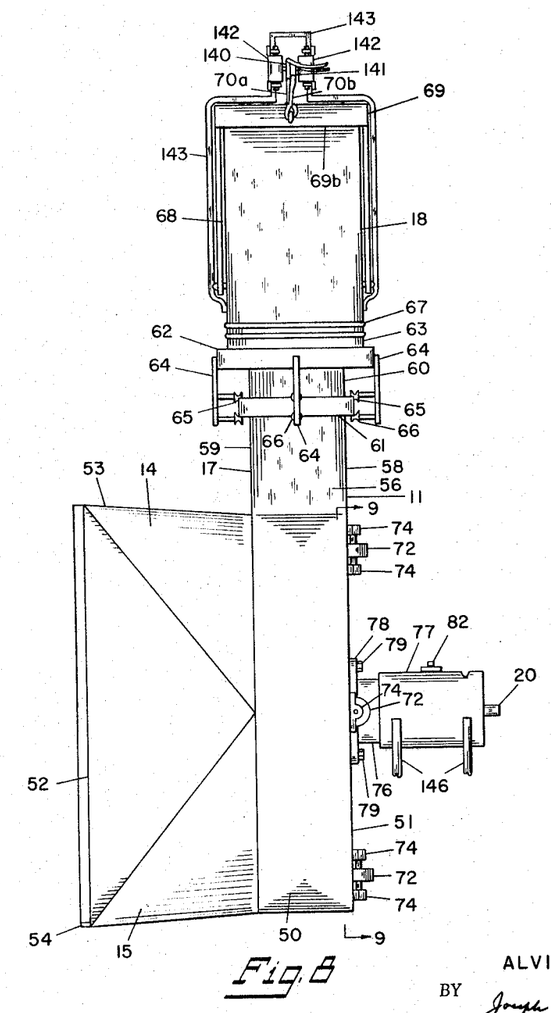
FIG. 8 is a side view of the housing of FIG. 6.
Figure 9:
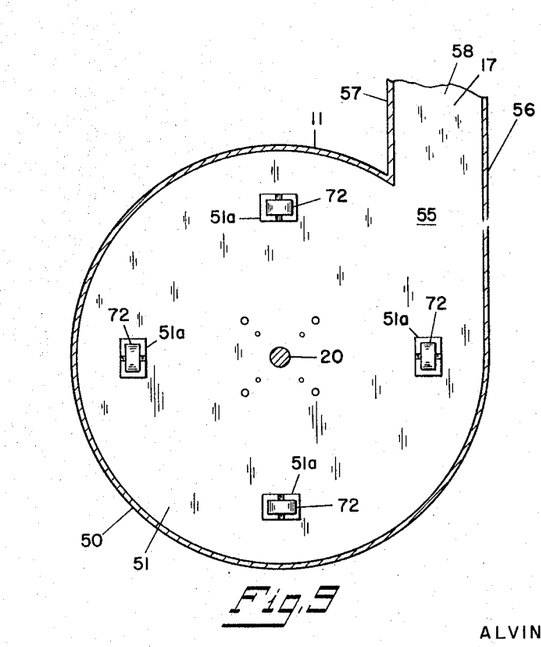
FIG. 9 is a section view taken along line 9—9 in FIG. 8.

The cylindrical surface 50 is not closed, as shown by FIGS. 7 and 9. Instead, it has a tangential opening 55 through which snow is discharged from the housing 11 to the spout 17. The fixed spout 17 extends upward from the housing 11 in communication with the opening 55. The spout 17, which is approximately rectangular in cross-section, has a right side 56, a left side 57, a back 58 and a front 59. Preferably, the right side 56 is a substantially vertical, tangential extension of the cylindrical surface 50, and the back 58 is an extension of the back 51.

The nozzle 18 is rotatably attached to the top 60 of the spout 17. My novel structure for making that attachment is shown in FIGS. 6 to 8 and 10. A ring 61 having a substantially vertical wall encircles the spout top 60 in spaced relation. It is secured to the spout top 60 by spacers (not shown) or other similar means. A ring 62 is preferably secured to the bottom 63 of the nozzle 18. Downwardly hanging clamps 64 are attached to the ring 62 at spaced intervals. Each clamp 64 carries an upper roller 65 and a lower roller 66, both of which are preferably V-grooved. The lower ring 61 is gripped between each pair of rollers 64 and 65, as shown. The upper rollers 65 ride on the top edge of the ring 61 and the lower rollers 66 bear against the bottom edge of the ring 61. The ring 61 thus acts as a track for the rollers 65 and 66. The nozzle 18 may travel a full 360° arc on the rollers 65 and 66. Any suitable device may be provided to allow the operator of the snow plow to rotate the nozzle 18. The illustrated device is a cable 67 which is secured to and wound several times around the nozzle bottom 63. The use of the structure including the ring 61 allows the nozzle 18 to have a substantially larger cross-section than the spout 17, as is evident from the drawings. However, the downwardly hanging clamps 64 may be attached directly to the bottom 63 of the nozzle 18, if desired.

A hood 69 is pivotally secured to the forward portion 68 of the nozzle 18. The hood 69 is adjustable to direct the flow of snow either upward or downward. The hood 69 is controlled by a pair of control cables 70a and 70b which are attached to the forward and rearward portions 69a and 69b, respectively, of the hood 69. As best shown in FIGS. 6 and 6a, the control cables 70a and 70b are threaded over pulleys 140 and 141, respectively, and between vertical rollers 142 toward the driver of the snow plow. The pulleys 140 and 141 are preferably of different diameters, as shown, so that when the nozzle 18 is rotated by the cable 67 to a position wherein one or the other of the vertical rollers 142 engages the control cables 70a and 70b, the control cables 70a and 70b will be vertically displaced from each other to avoid interference. The pulleys 140 and 141, and the vertical rollers 142 are preferably supported by a suitable bracket assembly 143 attached to and extending upwardly from the nozzle 18, as shown. Alternatively, the hood 69 may be controlled by a hydraulic cylinder 144 and piston 145, as shown in FIG. 7. The hood 69 may be controlled by any other suitable means, as desired.

For efficient operation of the rotor 10, it is desirable to prevent contact of the rear face 30 of the back plate 21 with the back 51 of the rotor housing 11. FIGS. 7 and 9 shows one preferred way of achieving that prevention. A plurality of rollers 72 are rotatably mounted by brackets 74 on the outer face 73 of the rotor housing back 51, so that they extend into the housing 11 through roller openings 51a in the housing back 51. The rear face 30 of the rotor back plate 21 should normally be spaced slightly forward of the rollers 72. If the pressure of snow entering the rotor 10 becomes great enough, it will press the rear face 30 against the rollers 72. Contact between the rotor rear face 30 and the rollers 72 will be apparent to the operator who can then relieve the pressure by proceeding at a slower pace. The use of the rollers 72 prevents excessive friction losses due to sliding contact between the rotor back plate 21 and the housing back 51 when the rotor is under full load, thereby providing more efficient operation of my rotary snow plow, and increasing its snow blowing capacity.

The novel structure for pivotally connecting the single rotor housing 11 to the vehicle 19 which supports the housing 11 and drives the rotor 10 is shown in FIGS. 8, 10, 11, and 15. Essentially, the structure comprises an inner cylinder 76 which rotatably fits within an outer cylinder 77. The inner cylinder 76 has a flange 78 through which it is secured to the back 51 of the rotor housing 11 by bolts 79 or other suitable means. The outer cylinder 77 is closed at one end by a wall 80 having a centrally located aperture 81.

Figures 10, 11, 13:
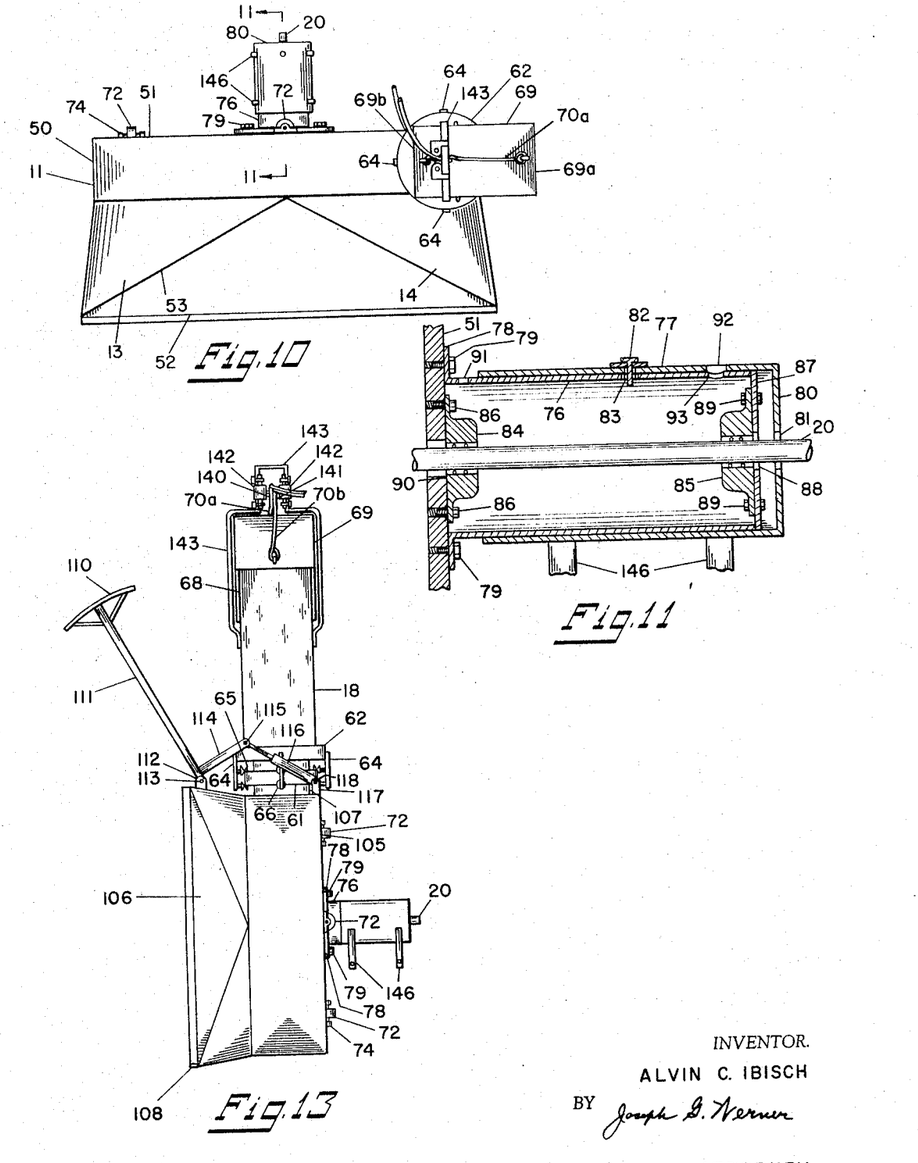
FIG. 10 is a top view of the housing of FIG. 6.
FIG. 11 is a section view taken along line 11—11 in FIG. 10.
FIG. 13 is a side view of the rotor housing of FIG. 12.

The rotor shaft 20 is rotatably mounted in flanges 84 and 85, as shown in FIG. 11. Ball bearings are preferred for the mountings. The flange 84 is attached to the back 51 of the rotor rousing 11 within the area of the back 51 enclosed by the inner cylinder 76. Bolts 86 or any other suitable means may be used for the attachment. The end of the inner cylinder 76 with the flange 78 is open, while its other end is closed by a wall 87 having a centrally located aperture 88. The flange 85 is within the inner cylinder 76 and secured to the wall 87 by bolts 89 or other suitable means. The shaft 20 extends through an opening 90 in the rotor housing back 51, through the flanges 84 and 85, through the aperture 88 in the wall 87, and then through the aperture 81 in the wall 80. The inner cylinder 76 has a hole 91 adjacent the flange 84, and the inner cylinder 76 and the outer cylinder 77 have mating holes 92 and 93 adjacent the flange 85. The holes 91, 92 and 93 provide access to grease fittings for the bearings in the flanges 84 and 85.

The outer cylinder 77 is adapted to be supported in any desired manner by the propelling vehicle 19 or by self-propelling means integral to the rotary snow plow. For example one or more support brackets 146 may be attached to the cylinder 77 and the frame or other supporting structure of the propelling vehicle 19 to support the rotary snow plow. Preferably, the supporting structure will include means for raising and lowering the outer cylinder 77 and supported rotor housing 11 to allow its operation in several positions, and to permit the rotor housing 11 to be raised for easy transport. Any conventional means, such as mechanical, hydraulic or electrical, may be employed to raise and lower the rotor housing 11 and supported elements.

A pin 82 attached to the outer cylinder 77 projects into a circumferentially extending slot 83 in the inner cylinder. The arcuate length of the slot 83 determines the arcuate distance the inner cylinder 76 and supported rotor housing 11 can rotate with respect to the outer cylinder 77 and the propelling vehicle 19 to follow irregularities in the surface being plowed. Any suitable means, such as a pair of universal joints (not shown), may be employed to connect the rotor shaft 20 to the power-takeoff shaft or other driving means of the propelling vehicle 19.

In typical operation, the funnel 53 guides snow directly in its path to the rotor 10. Under some conditions, however, the rotor 10 may have a capacity for more snow than is directly in the path of the funnel 53. When that is true, a wing blade 95 of the type shown in FIGS. 14 and 15 may be used in conjunction with the funnel 53.

Figure 14:
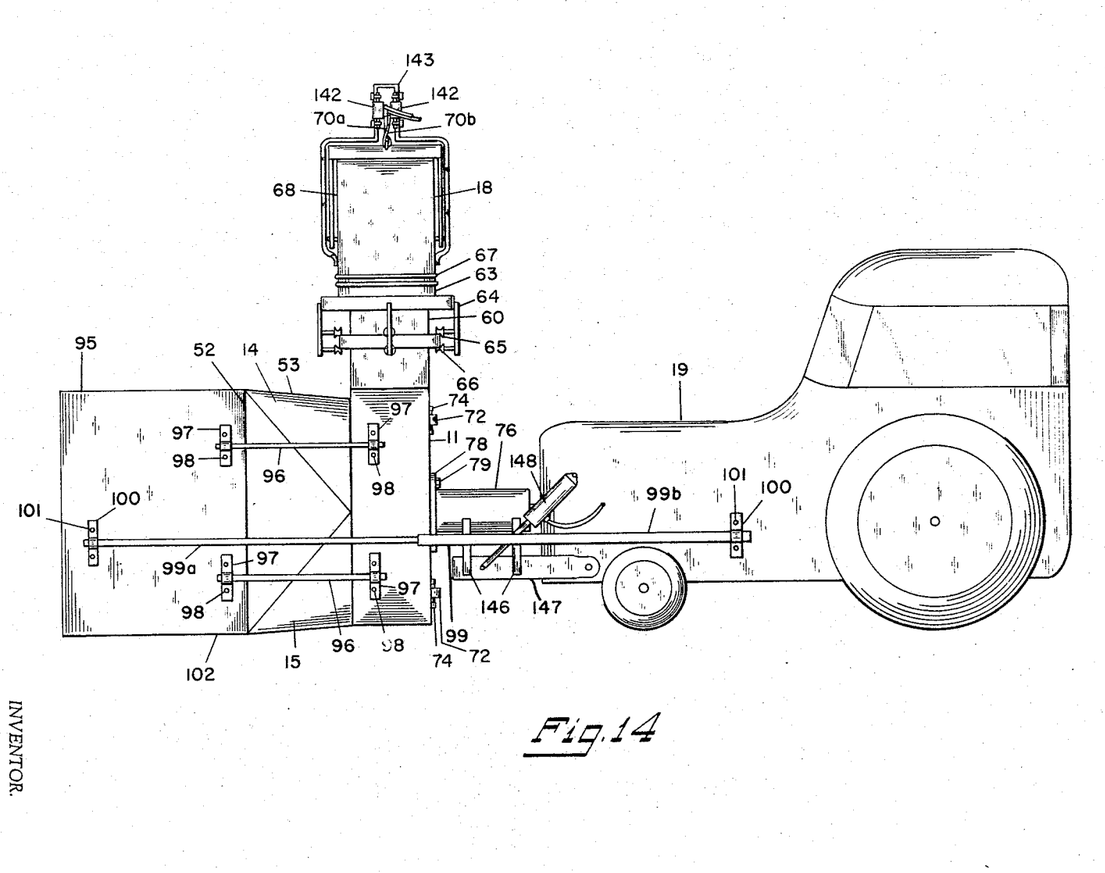
FIG. 14 is a side view of a rotary snow plow comprising the rotor housing of FIG. 6 attached to a vehicle which drives the rotor.

The wing blade 95 is secured to the rotor housing 11 by the links 96. The links 96 are pivotally attached to both the wing blade 95 and the rotor housing 11. Brackets 97 and pins 98 and 98a or other suitable means may be used for the pivotable attachment. A telescoping pole 99 extends between the wing blade 95 and the vehicle 19. The pole 99 has a first section 99a which is pivotally secured to the wing blade 95, and a second section 99b which is pivotally secured to the vehicle 19. The sections may be secured by brackets 100 and pins 101 and 101a, or any other suitable means.

The substantially vertical wing blade 95 is pivotable on the links 96 back and forth between an operating position and a storage position. FIGS. 14 and 15 illustrate the operating position. In that position the wing blade 95 projects laterally outward from one side of the funnel 53. The inner end 102 of the wing blade 95 pivots into engagement with that side of the funnel 53. The telescoping pole 99 supports the wing blade 94 in the operating position with the inner end 95 so engaged. When the wing blade 95 is not needed for the particular plowing operation, it is pivoted on the links 96 to the storage position (not shown), in which it rests along the side of the snow plow. The telescoping pole 99 is shortened to permit the wing 95 to rest along the side of the plow.

Figure 12:
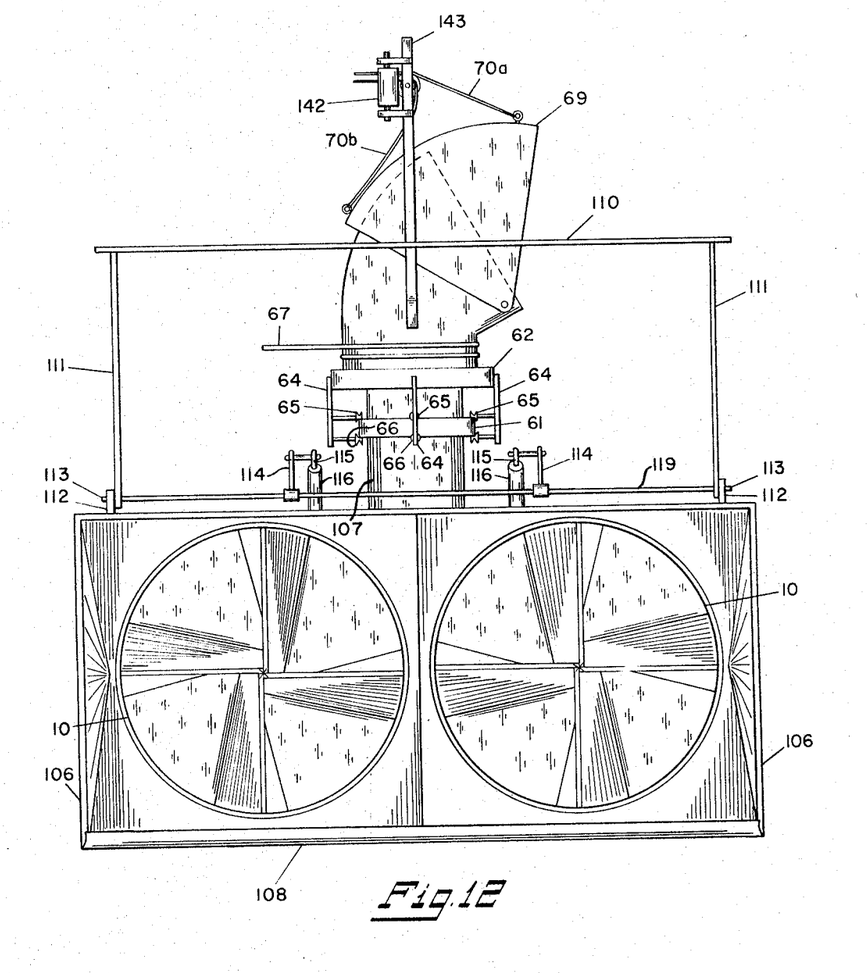
FIG. 12 is a front view of a rotor housing for a rotary snow plow employing two of the rotors of FIG. 1.

The rotary snow blower of FIG. 6 has one rotor 10, and is particularly adapted for individual use with a garden tractor or other small propelling means. However, snow blowers with more than one rotor may often be used, especially in heavy highway work and the like. A rotary snow plow having two rotors 10 is shown in FIGS. 12, 13 and 14. The rotors 10 are mounted side by side within a rotor housing 105. Each rotor 10 has its own funnel 106 which is similar in construction to the funnel 53. A blade 108 is attached along the bottom of the twin funnel 106. Preferably the two rotors 10 share a single spout 107 which projects from approximately the center of the rotor housing 106. As viewed in FIG. 12, the right rotor 10 rotates clockwise to throw snow into the spout 107, while the left rotor 10 rotates counterclockwise to throw snow into the spout 107. The nozzle 18, the hood 69 and the structure for rotatably securing the nozzle 18 to the spout 107 carry the same reference numerals as the corresponding elements in FIG. 6, to which they are identical. The two rotor snow blower is well adapted to heavy duty highway plowing and is preferably supported on the propelling highway vehicle 19 in substantially the same manner as the single rotor plow, except that the outer cylinder 77 is eliminated. Since there will be two or more rotor shafts 20, it is not possible or necessary to allow the two rotor snow blower housing to rotate with respect to the propelling vehicle. Thus, the support brackets 146 are preferably attached directly to cylinders 76, as shown in FIGS. 13 and 14.

FIG. 14 illustrates one possible mean for raising and lowering my rotary snow plow for travel or for snow removal. The support brackets 146 attached to the cylinder 76 are also attached to one or more support arms 147 pivotally mounted to the propelling vehicle 19. The support arms 147 and attached snow plow structure may be pivotally raised and lowered by a hydraulically operated cylinder 148, as shown, or by other conventional hydraulic, mechanical or electrical means controlled by the operator of the vehicle 19.

Some snow falls and snow drifts may pile higher than the funnel 53 for the rotor 10. To provide for such snow falls, the rotary snow plow may be equipped with a chopper blade 110, as shown in FIGS. 12 and 13. The chopper blade 110 may be used with either the one rotor snow plow of FIG. 6 or the two rotor snow plow of FIG. 12.

The chopper blade 110 is approximately as wide as the combined width of the funnels 106, and may be either straight or curved. It is rigidly secured to a pair of arms 111 which are each pivotally secured to the top of one of the funnels 106 by brackets 112 and pins 113 or other similar means. To better chop ice, the chopper blade 110 may be provided with teeth, if desired.

Any conventional means may be used to pivot the chopper blade 110. The illustrated means in FIGS. 12 and 13 comprises a link 114, a piston rod 115 and a double acting hydraulic cylinder 116 for each arm 111. Each cylinder 116 is pivotally connected to the top of the rotor housing 105 by a bracket 117 and pin 118. The link 114 connects the lower end 119 of each arm 111 and the piston rod 115. It is rigidly secured to the arms 111 and pivotally secured to the piston rods 115.

When the chopper blade 110 is not in use, the cylinders 116 and piston rods 115 hold it in the raised position shown in FIGS. 12 and 13. If the snow plow encounters high drifts of snow, the cylinders 116 and piston rods 115 are actuated by the operator, causing the blade 110 to pivot downwardly and chop the piled snow into the funnels 106. Further actuation of the cylinders 116 and the piston rods 115 pivots the blade 110 back to the raised position, ready for the next chopping stroke.

A practical and worthwhile feature of my novel snow plow is its ability to travel over curbs or other obstructions. Novel structure for achieving that ability is shown in detail in FIGS. 15, 16 and 17.

Figure 16:
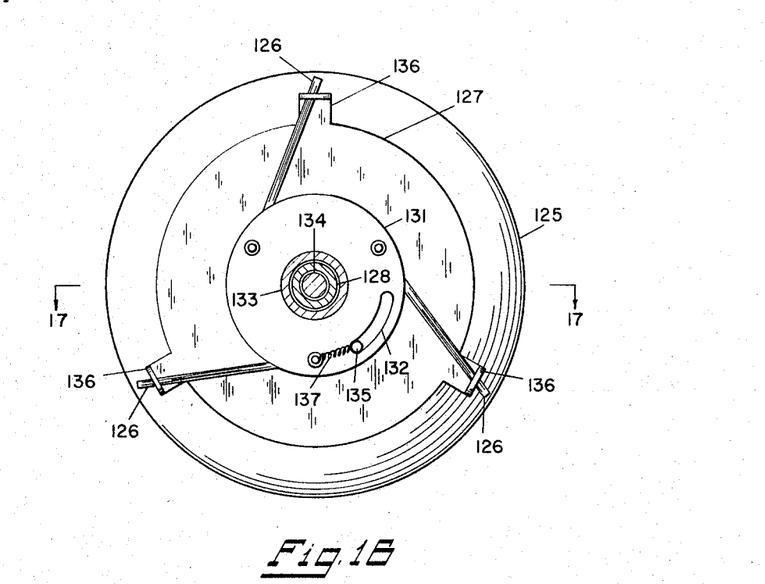
FIG. 16 is a section view taken along line 16—16 in FIG. 15.
Figure 17:
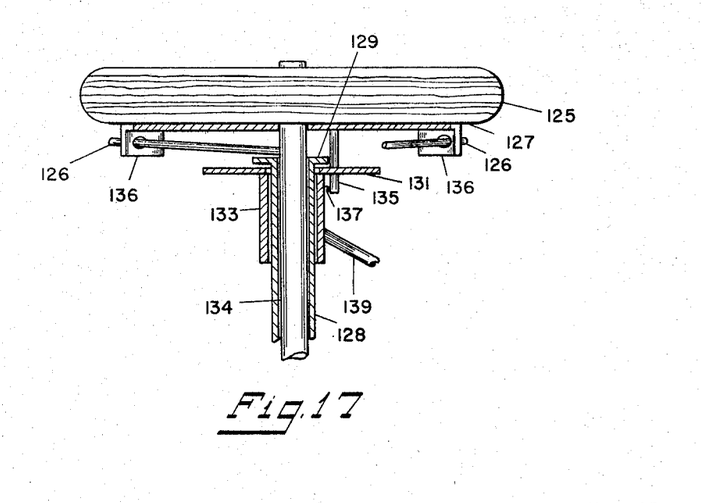
FIG. 17 is a section view taken along line 17—17 in FIG. 16.
Figure 19:
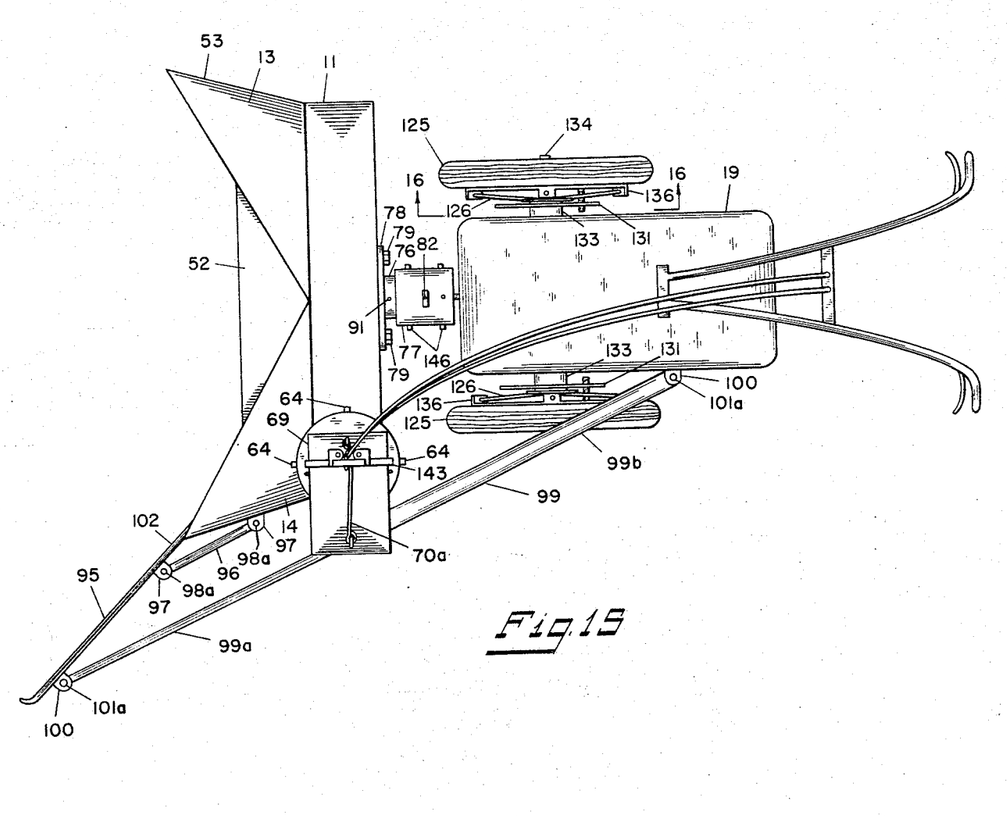

When my snow plow is being propelled by a small two wheel propelling vehicle 19, as shown in FIG. 15, or other self-propelling means, each driving wheel 125 of vehicle 19 may preferably be provided with a plurality of protractable legs 126. Non-radial, the legs 126 extend in substantially parallel relation to the inner face 127 of their associated wheels 125, as shown in FIG. 17. When not in use, the legs 126 extend approximately to but not beyond the periphery of the wheel 125, as best shown in FIG. 16. When the vehicle 19 must travel over a curb, the legs 126 are extended to a position in which they project substantially radially beyond the periphery of the wheel 125. The legs 126 then, in effect, walk the wheel 125 over the curb. Once the curb is climbed, the legs 126 are returned to the retracted position of FIGS. 16 and 17.

In addition to the legs 126, the basic parts of the curb climbing structure include an axle housing 128 having a flange 129 at its outer end 130, a clutch plate 131 having a slot 132, and a substantially tubular bearing member 133. The wheel 125 is rigidly secured to an axle 134 which is rotatably mounted within the axle housing 128 by any conventional means. The bearing member 133 and the clutch plate 131 are rotatably and slidably mounted upon the axle housing 128. The clutch plate 131 is located between the flange 129 and the bearing member 133. A pin 135 projects from the wheel inner face 127 through the slot 132.

The legs 126 are rotatably secured to the clutch plate 131 at substantially equally spaced distances around its periphery. Each leg 126 is slidably supported by a bracket 136. Preferably angle irons, the brackets 136 are secured to the wheel inner face 127 and separated by substantially equal arcuate distances.

A tension spring 137 is connected between one of the legs 126 secured to the clutch plate 131 and the pin 135 to normally bias the plate 131 to a position in which the pin rests at one end of the slot 132. When the clutch plate 131 is biased to that position, the legs 126 are in the retracted position of FIGS. 16 and 17. If desired, the spring 137 may be attached directly to the clutch plate 131 rather than to the leg 126.

The operator preferably controls the clutch plate 131 by means of a lever 139 or other suitable means attached to the bearing member 133. The bearing member 133 has an operative position and an inoperative position. In the inoperative position, which is shown in FIG. 17, the bearing member 133 does not bear against the clutch plate 131. In the operative position, the bearing member 133 bears against the plate 131 and forces it against the flange 129 in frictional engagement.

Normally, the legs 126 are in the retracted position shown in FIGS. 16 and 17 and the bearing member 133 is in the inoperative position of FIG. 17. The wheel 125 and the plate 131, held in fixed relation to each other by the pin 135 and the spring 137, rotate together with respect to the axle housing 128. The forward direction for the wheel 125 as viewed in FIG. 16 is counterclockwise.

Suppose now that the vehicle 19 must travel over a curb, or other obstruction. The lever 139 is actuated to slide the bearing member 133 to its operative position. The resulting frictional engagement of the clutch plate 131 and the flange 129 momentarily stops the rotation of the plate 131. It does not stop the rotation of the wheel 125. While the plate 131 is so stopped, the wheel 125 rotates an arcuate distance with respect to the clutch plate 131, the length of which is determined by the length of the slot 132. During such rotation of the wheel 125, each leg 126 slides outwardly through its corresponding bracket 136 as the legs 126 assume more nearly radial positions wherein they extend beyond the periphery of the wheel 125. In that extended position, the legs 126 engage the ground or highway, and in rotation raise their corresponding wheels 125 over or upon the curb or other obstruction. When the wheel 125 has completed its rotation of the pin 125 to the other end of the slot 132, the wheel 125 and the clutch plate 131 again rotate together with respect to the axle housing 128 and flange 129. The clutch plate 131 is still frictionally engaged by the flange 129, but the force of the pin 125 against the end of the slot 132 overcomes the restraining force of that friction.

The legs 126 remain in their extended position as long as the bearing member 133 is in its operative position and bears against the clutch plate 131. When the legs 126 are no longer needed, the lever 139 is used to move the bearing member 133 to its inoperative position. That movement disengages the clutch plate 131 and the flange 129, allowing the spring 137 to return the clutch plate 131 to the position of FIG. 16, in which position the legs 126 are again retracted.

It is understood that my invention is not confined to the particular construction and arrangement of parts illustrated and described, but embraces all such modified forms thereof as come within the scope of the following claims.

I claim:

1. In a rotary snow plow, a rotor comprising:
 (a) a substantially circular back plate having a front face and a rear face,
 (b) a plurality of substantially flat paddles having a forward edge and a rear edge and being secured at said rear edge to said back plate front face in substantially perpendicular relation,
 (c) each of said paddles being secured to the next adjacent paddle to form a housing extending outwardly from the center of said back plate front face in substantially perpendicular relation,
 (d) said housing being adapted to be fixedly mounted on a substantially horizontal rotatable shaft,
 (e) said back plate and said paddles defining a plurality of substantially equal size pockets,
 (f) a blade secured in front of each of said pockets, the outline of said blades being approximately the same as that of the cross-section of the adjacent pocket,
 (g) each blade having a first flat portion having a circumferential edge and a second forwardly sloping portion having a circumferential edge whereby an opening is defined between the adjacent first and second portions of each adjacent pair of blades to provide a front entrance to each pocket,
 (h) a circumferential triangular-shaped panel secured to said adjacent first and second portions of each adjacent pair of blades each of said circumferential triangular-shaped panels extending substantially the entire length of the circumferential edge of the second portion to which it is attached and only a portion of the length of the circumferential edge of the first portion to which it is attached, said triangular-shaped panels providing a series of arcuate cutting edges between said first and second portion of each adjacent pair of blades.

2. The invention described in claim 1 wherein each of said blades has a leading radial edge with an outer corner and an inner corner adjacent the second portion thereof, and wherein said second portion of each blade so slopes from the first portion thereof that the outer corner of said leading radial edge projects further forward than its inner corner.

3. The invention described in claim 1 wherein each of the paddles has an outside edge substantially in alignment with the outer perimeter of the back plate and an inner edge located at said housing and wherein said outside edge of each paddle is longer in axial length than said inside edge of each paddle.

4. The invention described in claim 1 wherein a hub adapted to be fixedly mounted on a rotatable shaft extends through said back plate and within said housing in fixed relation, and wherein each of the paddles is tangent to the hub and extends past the hub to intersect the next succeeding paddle, each paddle being secured to the next paddle at their line of intersection.

5. The invention described in claim 1 wherein the paddles each have a relatively small hole extending therethrough to permit air to pass from one pocket to the next during operation.

6. The invention described in claim 1 wherein each blade has a trailing edge adjacent the blade first portion and a leading edge adjacent the blade second portion, each blade being secured at its trailing edge to the forward edge of a paddle in perpendicular relation to said paddle, and each circumferential triangular-shaped panel being secured to the circumferential edge of one blade adjacent the first portion of said one blade and being secured to the circumferential edge of the next succeeding blade adjacent the second portion of said next blade to define the outer limit of the opening between the said first and second portions, respectively of said blades.

7. The invention described in claim 6 wherein the trailing radial edge of each blade is secured to the forward edge of the adjacent paddle for a substantial length along said paddle forward edge, and wherein each of said leading radial edges extends from a point axially aligned with the center of said hub to a point axially aligned with the perimeter of said back plate and forwardly spaced from the forward edge of the other paddle defining the pocket behind said blade.

8. In a rotary senow plow, a rotor comprising:
(a) a hub adapted to be rotatably mounted on a substantially horizontal shaft,
(b) a substantially circular back plate secured to said hub in substantially perpendicular relation and having a front face and a rear face,
(c) a plurality of substantially flat paddles having a forward edge, an outer edge and a rear edge, and being secured at said rear edge to the front face of said back plate in substantially perpendicular relation to define a plurality of substantially equal seize pockets,
(d) said paddles being attached to said hub and extending outwardly therefrom, the outer edges of said paddles and the perimeter of said back plate being substantially equidistant from said hub,
(e) a blade for each of said pockets, each blade having a leading radial edge, a trailing radial edge, a circumferential edge, a first portion substantially parallel to said back plate and including said trailing radial edge and a second portion sloping forwardly from said first portion and including said leading radial edge,
(f) each blade being secured at its said trailing radial edge to the forward edge of a paddle such that it extends in front of its associated pocket with its said leading radial edge spaced forwardly from the forward edge of the other of said paddles defining said pocket,
(g) a plurality of circumferential triangular-shaped panels, one of said panels being secured to the entire circumferential edge of said second portion of each blade and to only a portion of the circumferential edge of said first portion of the next succeeding blade,
(h) said secured panel, blade second portion and blade first portion defining an opening to the pocket located partially behind said second portion.

9. In a rotary snow plow, a rotor comprising:
(a) a substantially circular back plate having a front face and a rear face,
(b) a plurality of substantially flat paddles having a forward edge and a rear edge and being secured at said rear edge to said back plate front face in substantially perpendicular relation,
(c) each of said paddles being secured to the next adjacent paddle to form a housing extending outwardly from the center of said back plate front face in substantially perpendicular relation,
(d) said housing being adapted to be fixedly mounted on a substantially horizontal rotatable shaft,
(e) said back plate and said paddles defining a plurality of substantially equal size pockets,
(f) a blade secured in front of each of said pockets, the outline of said blades being approximately the same as that of the cross-section of the adjacent pocket,
(g) each blade having a first flat portion and a second forwardly sloping portion whereby an opening is defined between the adjacent first and second portions of each adjacent pair of blades to provide a front entrance to each pocket,
(h) a circumferential panel secured to said adjacent first and second portions of each adjacent pair of blades,
(i) a plurality of vanes projecting from the rear face of the back plate.

References Cited by the Examiner
UNITED STATES PATENTS

| | | | |
|---|---|---|---|
| 338,759 | 3/1886 | Leslie | 37—21 |
| 450,487 | 4/1891 | Haughawout | 37—21 |
| 541,766 | 6/1895 | Linton | 37—22 |
| 1,703,740 | 2/1929 | Liddell | 37—43 |
| 1,770,587 | 7/1930 | Carpenter | 37—43 |
| 2,518,622 | 8/1950 | Ingersoll | 37—43 |
| 2,769,254 | 11/1956 | Wright | 37—21 |
| 2,971,279 | 2/1961 | Blanchet | 37—43 |

ABRAHAM G. STONE, *Primary Examiner.*

R. L. HOLLISTER, *Assistant Examiner.*